March 16, 1948.  J. STRANSKY  2,438,024
MILK BOTTLE UTILITY DEVICE
Filed Jan. 26, 1946
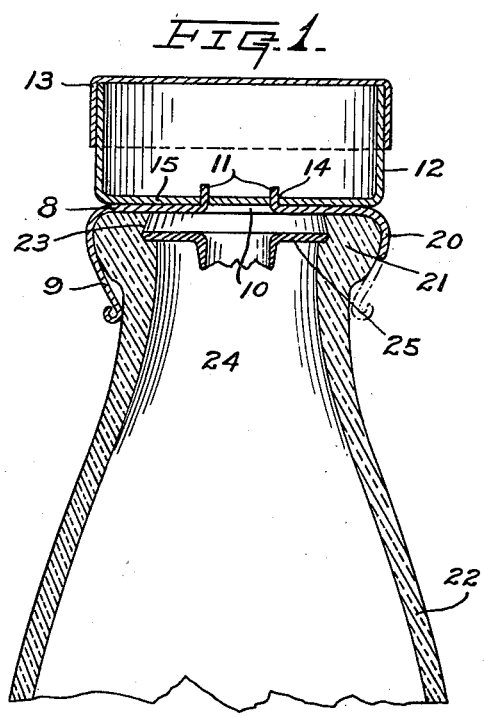
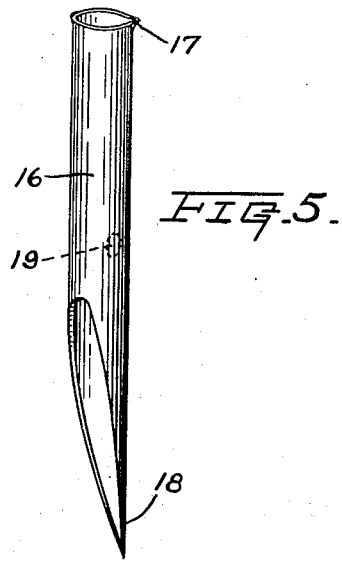
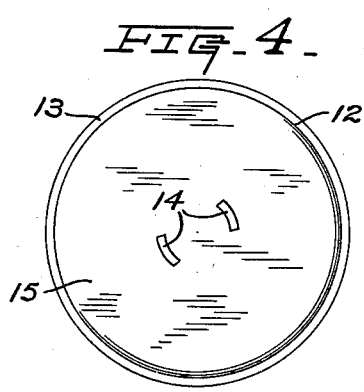
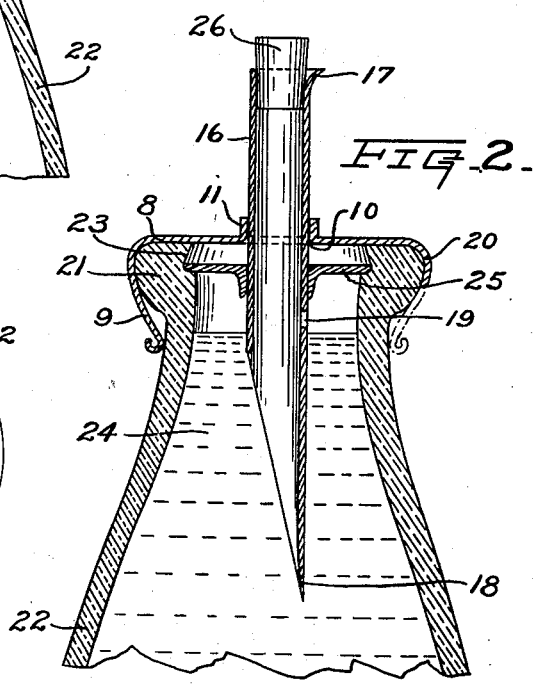
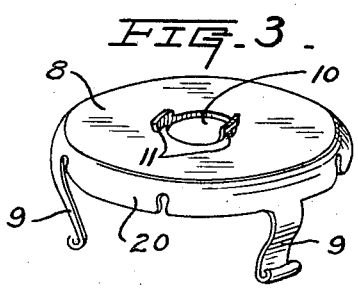
INVENTOR.
Joseph Stransky
BY
Lieber & Lieber
ATTORNEYS Patented Mar. 16, 1948

2,438,024

UNITED STATES PATENT OFFICE 2,438,024

MILK BOTTLE UTILITY DEVICE

Joseph Stransky, Chilton, Wis.

Application January 26, 1946, Serial No. 643,736

5 Claims. (Cl. 215—101)

The present invention relates generally to improvements in devices for facilitating the use of ordinary milk bottles, and relates more specifically to improvements in the construction and operation of accessories associable with standard milk bottles or the like, for expediting ordering and payment of the milk and removal thereof from the receptacles.

The primary object of my invention is to provide a new and useful milk bottle utility device which is simple in construction, and which is moreover applicable to standard milk bottles so as to greatly increase the utility thereof.

It is frequently desirable and common practice especially in rural districts, for customers to transmit milk orders and tickets or money in payment of the commodity, by placing the messages or money in the empty bottles which are left outdoors for collection by the milkman. When the interiors of the bottles are not perfectly dry, the notations or money thus confined in the empty receptacles, stick or freeze within the bottles and cannot be readily removed, thus not only retarding the milkman's progress, but also producing considerable annoyance and often precluding accurate filling of the orders.

It is also a well known fact, that when bottled milk is permitted to rest for a while, the cream accumulates at the top of each bottle while the lower portion of the milk is relatively free of cream. If the contents of the bottle is subsequently poured without inverting and shaking the mass, the cream will be quickly removed during initial pouring, and only skimmed milk remains. Then too, each bottle is provided with a sealing disc and has a brim extending outwardly beyond the disc, and if this brim is not protected by an outer cap it becomes soiled and dirty and must first be thoroughly wiped and cleansed in order to prevent contamination of the milk which is subsequently poured thereover.

The present invention contemplates the provision of a simple utility device for facilitating the application of notations or money to an empty milk bottle, and for interchangeably facilitating the removal or pouring of thoroughly mixed milk and cream from commodity laden milk bottles or the like.

A more specific object of the invention is to provide an improved attachment, applicable to the open ends of standard milk bottles in order to protect the same while also serving the dual function of holding a money receiving receptacle, and of providing a guide for a sanitary mixing and pouring spout.

Another specific object of this invention is to provide an improved money or notation confining receptacle which is readily attachable to and removable from a standard milk bottle, and which effectively protects its contents from the weather.

Still another specific object of my invention is to provide an improved pouring spout for most effectively delivering uniformly mixed milk from a bottle, without causing the milk to contact the outer brim of the bottle, and without necessitating removal of the sealing disc.

An additional specific object of the present invention is to provide an improved milk bottle utility device which is flexible in its adaptations, and which may also be manufactured and sold at moderate cost.

These and other specific objects and advantages of the invention will be apparent from the following detailed description.

A clear conception of the features constituting my present improvement, and of the construction and operation of a typical utility device embodying the invention, may be had by referring to the drawing accompanying and forming a part of this specification wherein like reference characters designate the same or similar parts in the various views.

Fig. 1 is a central vertical section through the improved supporting and guiding cap of my device and through a money box detachably applied thereto, showing the assemblage applied to a fragment of an empty milk bottle;

Fig. 2 is a similar section through the supporting and guiding cap and through a pouring spout inserted within the guide opening thereof, showing the modified assemblage applied to a fragment of a milk filled bottle;

Fig. 3 is a perspective view of one of my improved box supporting and spout guiding caps alone;

Fig. 4 is a bottom view of the money box or receptacle removed from the cap; and Fig. 5 is a perspective view of the milk and cream mixing and mixture pouring spout of my device.

While the invention has been shown and described herein as being advantageously applicable to disc sealed standard milk bottles, it is not my desire or intention to unnecessarily restrict the utility of the improved features by virtue of this limited embodiment.

Referring to the drawing, the improved typical utility assemblage shown therein, comprises in general a rigid supporting and guiding cap 8 having a plurality of resilient fingers 9 depending from equally spaced portions of its periphery, and being provided with a central circular opening 10 and with hooks 11 projecting upwardly on opposite sides of the opening; a rigid circular box or receptacle 12 having a removable closure cover 13, and being provided with arcuate slots 14 in its flat bottom 15 which are adapted to interlockingly receive the hooks 11 of the supporting cap 8; and a tubular rigid commodity mixing and pouring spout 16 having a pouring snout 17 at one end, a sharp or pointed opposite disc piercing end 18, and my intermediate cream circulating hole 19 therein between the ends 17, 18.

The supporting and guiding cap 8 may be formed of any suitable resilient material such as sheet metal or plastic, and may be provided with a peripheral apron rim 20 between the retaining fingers 9 thereof. This cap 8 is adapted to be rather firmly applied to the thickened upper brim 21 of a standard milk receptacle or bottle 22, and each of these bottles 22 is provided with a recess 23 above its outlet throat 24, for confining a sealing disc 25 therein. When a cap 8 is applied to such a bottle 22, the resilient arms or fingers 9 will snugly embrace the enlarged brim 21 and will contact the neck of the bottle, while the apron rim 20 will cover the upper surface of the brim 21 and the opening 10 will be disposed centrally of the throat 24.

The receptacle or box 12 and the cover 13 may also be formed of durable and rigid sheet metal or plastic and in order to detachably apply a box 12 to a cap 8, it is only necessary to insert the upstanding hooks 11 of the cap 8 within the openings or slots 14 in the flat box bottom 15, and to relatively turn the box and cap until the hooks 11 become effective to unite the parts. The hooks 11 and slots 14 thus provide a gunlock attachment which effectively unites the elements but which may also be readily released, and when the box 12 is attached to the cap 8, the flat bottom 15 snugly engages the top of the cap, thus tightly sealing the box, as illustrated in Fig. 1. The cover 13 should snugly fit the box 12 so as to prevent ingress of moisture, and to thoroughly protect notations, tickets or money confined within the receptacle.

The improved pouring spout 16 may be formed of tubular metal stock such as stainless steel, and should have an external diameter sufficiently large that the spout will snugly fit the central cap opening 10 and the hooks 11 when applied as shown in Fig. 2. The spout 16 should be of sufficient length to extend well into the throat 24 of the bottle 22, and the cream circulating hole 19 should be exposed to the interior of the bottle when the spout is applied to a milk filled bottle. The pointed end 18 of the pouring spout should be sufficiently sharp that it will readily pierce a standard sealing disc 25 when the spout 16 is inserted through the cap opening 10, and a cork or rubber stopper 26 may be utilized to close the outer end of the spout when not in use.

When the spout 16 has been properly applied to a milk bottle 22 as shown, and milk is poured through the assemblage by tilting the bottle, the cream will circulate through the opening or hole 19 and will mix with the stream flowing through the spout interior, thus insuring delivery of a uniform mixture of milk and cream. After considerable milk has been removed from the bottle 22, the spout 16 may be raised so as to bring the hole 19 directly adjacent to one of the hooks 11 and to also bring the upper edge of the pointed end 18 within the central flange of the sealing disc 25, thereby permitting all of the milk to be poured from within the bottle while the cap 8 and spout 16 remain applied thereto.

From the foregoing detailed description it will be apparent that my present invention provides an improved utility device for standard milk bottles, which may be employed to interchangeably apply either a money receptacle or an efficient pouring spout to the bottles. While it is desirable to form the pouring spout 16 of stainless steel or the like, the cap 8 and box 12 may be formed of plated sheet metal or of durable plastic; and the box 12 may be readily applied to or removed from the cap 8, while the spout 16 may also be conveniently inserted within or withdrawn from the central cap opening 10. The cap 8 may also be quickly applied to or removed from the successive bottles 22, and by utilizing the pouring spout 16, it is not necessary to pour the milk over dirty and unsanitary surfaces of the bottle brim 21 as with the prior pouring methods. The various parts of the assemblage may be readily manufactured with the aid of punches and dies and at moderate cost, and the box 12 and its cover 13 effectively confine and conceal the messages, tickets or money placed therein and protect the same against inclement weather. The use of a single cap 8 cooperable with both the box 12 and with the pouring spout 16 also reduces the manufacturing cost to a minimum, and the pouring spout 16 is formed to most effectively mix the milk and cream while being poured and without necessity of shaking the bottles 22.

It should be understood that it is not desired to limit this invention to the exact details of construction or to the precise mode of use herein shown and described for various modifications within the scope of the appended claims may occur to persons skilled in the art.

I claim:

1. A milk bottle utility device comprising, a cap having resilient fingers formed for coaction with the brim of a standard milk bottle to firmly position the cap against the top of the bottle, said cap having a central pouring opening and attaching means adjoining said opening, and a money box cooperable with said means to fasten the box to said cap and to thereby seal said opening.

2. A milk bottle utility device comprising, a cap having resilient fingers formed for coaction with the brim of a standard milk bottle to firmly position the cap against the top of the bottle, said cap having a central pouring opening and hooks projecting therefrom adjacent to said opening, and a money box cooperable with said hooks to detachably fasten the box to the cap, and to thereby seal said opening.

3. A milk bottle utility device comprising, a cap formed for firm but removable attachment to the upper portion of a standard milk bottle, said cap having a central pouring opening and integral hooks adjoining the opening, and a money box having slots cooperable with said hooks to detachably secure the box to the cap and to thereby seal said opening.

4. A milk bottle utility device comprising, a cap formed for attachment to the top of a standard milk bottle and having hooks projecting upwardly therefrom, and a money receptacle having bottom slots cooperable with said hooks to attach the box to the cap.

5. A milk bottle utility device comprising, a sheet metal closure cap having integral resilient fingers formed for coaction with the brim of a standard milk bottle to firmly position the cap against the bottle top and also having a medial pouring opening and integral hooks adjoining the opening, and a sheet metal money receptacle cooperable with said hooks to detachably fasten the receptacle to the cap and to thereby seal said opening.

JOSEPH STRANSKY.

REFERENCES CITED

The following references are of record in the file of this patent:

UNITED STATES PATENTS

| Number | Name | Date |
| --- | --- | --- |
| 1,027,421 | Jungclas | May 28, 1912 |
| 1,492,422 | Carter | Apr. 29, 1924 |
| 1,488,865 | Castor | Apr. 1, 1924 |
| 1,811,113 | Derby | June 23, 1931 |
| 2,314,607 | Clark | Mar. 23, 1943 |